(12) United States Patent
Lin et al.

(10) Patent No.: US 12,181,675 B2
(45) Date of Patent: Dec. 31, 2024

(54) AUGMENTED REALITY ELECTRONIC DEVICE

(71) Applicant: InnoLux Corporation, Miao-Li County (TW)

(72) Inventors: Chih-Lung Lin, Miao-Li County (TW); Jian-Min Leu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 29 days.

(21) Appl. No.: 18/106,506

(22) Filed: Feb. 7, 2023

(65) Prior Publication Data

US 2023/0296900 A1 Sep. 21, 2023

Related U.S. Application Data

(60) Provisional application No. 63/320,700, filed on Mar. 17, 2022.

(30) Foreign Application Priority Data

Dec. 5, 2022 (CN) .......................... 202211547178.9

(51) Int. Cl.
*G09G 5/00* (2006.01)
*G02B 26/06* (2006.01)
*G02B 27/01* (2006.01)
*G02B 27/28* (2006.01)

(52) U.S. Cl.
CPC ......... *G02B 27/0172* (2013.01); *G02B 26/06* (2013.01); *G02B 27/0176* (2013.01); *G02B 27/286* (2013.01)

(58) Field of Classification Search
CPC ................ G02B 27/0172; G02B 26/06; G02B 27/0176; G02B 27/286; G02B 2027/0118; G02B 2027/012; G02B 27/28; G02B 27/0018; G02B 5/30; G02B 6/0011; G02B 2027/0178
USPC ................ 345/690, 156, 175, 84, 87, 8, 7, 9
See application file for complete search history.

(56) References Cited

U.S. PATENT DOCUMENTS

| | | | |
|---|---|---|---|
| 2018/0157053 A1* | 6/2018 | Richards | G02B 6/0068 |
| 2019/0072805 A1* | 3/2019 | Huang | G02F 1/13439 |
| 2019/0179205 A1* | 6/2019 | Shi | G02F 1/29 |
| 2020/0203324 A1* | 6/2020 | Shin | H01L 25/0753 |
| 2021/0003872 A1 | 1/2021 | Russell | |
| 2021/0048676 A1 | 2/2021 | Manly | |
| 2021/0080782 A1 | 3/2021 | Wang | |
| 2022/0059045 A1* | 2/2022 | Kobayashi | G06F 1/1652 |
| 2022/0269092 A1* | 8/2022 | Song | G02B 5/3016 |
| 2023/0157058 A1* | 5/2023 | Mundoor | H10K 50/868 257/40 |

(Continued)

FOREIGN PATENT DOCUMENTS

| | | |
|---|---|---|
| CN | 101169536 A | 4/2008 |
| CN | 202522812 U | 11/2012 |

*Primary Examiner* — Thuy N Pardo
(74) *Attorney, Agent, or Firm* — Winston Hsu

(57) ABSTRACT

An augmented reality electronic device includes a light adjusting component. The light adjusting component includes a panel and a first quarter wave plate. The panel includes a first substrate, a second substrate and a medium layer disposed between the first substrate and the second substrate. The first quarter wave plate is disposed on a first side of the panel.

18 Claims, 8 Drawing Sheets

(56) References Cited

U.S. PATENT DOCUMENTS

2023/0260476 A1* 8/2023 Shiibayashi ......... G09G 3/3696
                                                      345/690

* cited by examiner

AUGMENTED REALITY ELECTRONIC DEVICE

CROSS REFERENCE TO RELATED APPLICATION

This application claims the benefit of U.S. Provisional Application No. 63/320,700, filed on Mar. 17, 2022. The content of the application is incorporated herein by reference.

BACKGROUND OF THE DISCLOSURE

1. Field of the Disclosure

The present disclosure relates to an electronic device, and more particularly to an electronic device with high display quality.

2. Description of the Prior Art

As the evolution and development of electronic devices, the electronic devices have become an indispensable item, wherein an augmented reality electronic device enables the image displayed on its screen to integrate and/or interact with the real world. However, reflected light inside the augmented reality electronic device and/or some components of the augmented reality electronic device may adversely affect the display image (e.g., a ghost image is generated and/or a contrast ratio of the display image is decreased). Thus, the industry is committed to improving the above problem(s) so as to produce the augmented reality electronic device with high display quality.

SUMMARY OF THE DISCLOSURE

According to an embodiment, the present disclosure provides an augmented reality electronic device including a light adjusting component. The light adjusting component includes a panel and a first quarter wave plate. The panel includes a first substrate, a second substrate and a medium layer disposed between the first substrate and the second substrate. The first quarter wave plate is disposed on a first side of the panel.

According to another embodiment, the present disclosure provides an augmented reality electronic device including a light adjusting component. The light adjusting component includes a first substrate, a second substrate, a medium layer, a first quarter wave plate and a second quarter wave plate. The second substrate is opposite to the first substrate. The medium layer is disposed between the first substrate and the second substrate. The first quarter wave plate is disposed on a first side of the first substrate. The second quarter wave plate is disposed on a second side of the first substrate, wherein the second side is opposite to the first side, the second quarter wave plate is disposed between the first substrate and the medium layer.

DETAILED DESCRIPTION

Figure 1:
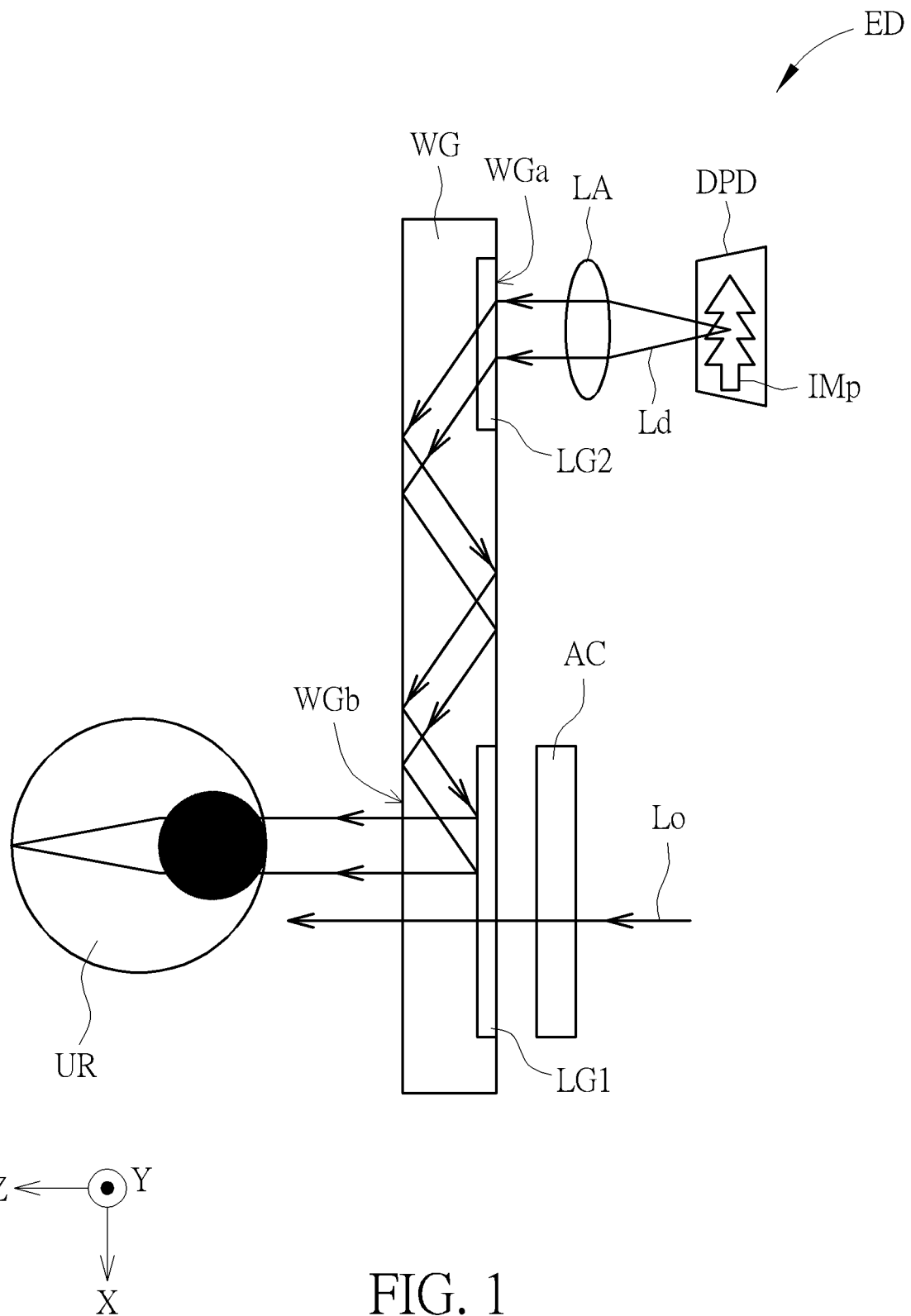
FIG. 1 is a schematic diagram showing a structure of an augmented reality electronic device according to an embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an electronic device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to … ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component(s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

In the description and following claims, the term "horizontal direction" generally means a direction parallel to a horizontal surface, the term "horizontal surface" generally means a surface parallel to a direction X and direction Y in the drawings, the term "vertical direction" generally means a direction parallel to a direction Z and perpendicular to the horizontal direction in the drawings, and the direction X, the direction Y and the direction Z are perpendicular to each other. In the description and following claims, the term "top view" generally means a viewing result viewing along the vertical direction. In the description and following claims, the term "cross-sectional view" generally means a viewing result viewing a structure cutting along the vertical direction along the horizontal direction.

In the description and following claims, it should be noted that the term "overlap" means that two elements overlap along the direction Z, and the term "overlap" can be "partially overlap" or "completely overlap" in unspecified circumstances.

The terms "about", "substantially", "equal", or "same" generally mean within ±20% of a given value or range, or mean within +10%, +5%, +3%, +2%, ±1%, or ±0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the augmented reality electronic device may include any required electronic device, wherein the electronic device(s) may include a display device, a backlight device, an antenna device, a sensing device and/or a tiled device, but not limited thereto. The augmented reality electronic device and/or the electronic device(s) of the augmented reality electronic device may be foldable and/or flexible. The display device may be a non-self-luminous type display device or a self-luminous type display device based on requirement(s), and the display device may be a color display device or a monochrome display device based on requirement(s). The antenna device may be a liquid-crystal-type antenna device or a non-liquid-crystal-type antenna device, the sensing device may be a device for sensing capacitance, light, thermal or ultrasonic, and the tiled device may be a tiled display device or a tiled antenna device, but not limited thereto. The electronic device may be any combination of aforementioned devices, but not limited thereto. The electronic components of the augmented reality electronic device may include passive component(s) and active component(s), such as capacitor(s), resistor(s), inductor(s), diode(s), transistor(s), but not limited thereto. The diode may include a light emitting diode (LED) or a photodiode. The light emitting diode may include organic light emitting diode (OLED), mini LED, micro LED or quantum dot LED, but not limited thereto. The transistor may include a top gate thin film transistor, a bottom gate thin film transistor or a dual gate thin film transistor, but not limited thereto. The augmented reality electronic device may include fluorescence material, phosphorescence material, quantum dot (QD) material or other suitable material based on requirement(s), but not limited thereto. The augmented reality electronic device may have a peripheral system (such as a driving system, a control system, a light system, etc.) for supporting the electronic device(s) (e.g., the display device, the backlight device, the antenna device, the sensing device or the tiled device) of the augmented reality electronic device. A shape of the augmented reality electronic device and/or a shape of the electronic device of the augmented reality electronic device may be a polygon (e.g., a rectangle), a shape having a curved edge (e.g., a circle, an oval) or other suitable shape, but not limited thereto.

Referring to FIG. 1, FIG. 1 is a schematic diagram showing a structure of an augmented reality electronic device according to an embodiment of the present disclosure, wherein the eye shown in FIG. 1 represents an user UR. As shown in FIG. 1, the augmented reality electronic device ED may include a display device DPD, wherein the display device DPD is configured to display a display image IMp in its display region. In this embodiment, the user UR may simultaneously see an external image (real world) and the display image IMp displayed by the display device DPD of the augmented reality electronic device ED through the augmented reality electronic device ED. For instance, the user UR may see a superimposed image of the display image IMp and the external image through the augmented reality electronic device ED, but not limited thereto. For instance, the user UR may see the an image which the display image IMp is embedded to the external image through the augmented reality electronic device ED, such that the external image may become a background of the display image IMp, but not limited thereto. Note that the image combined by the display image Imp and the external image and viewed by the user UR is referred as a combining image in the following.

The display device DPD may be a non-self-luminous type display device or a self-luminous type display device based on requirement(s), and the display device DPD may include the components and the structures corresponding to its type. For example, when the display device DPD is the non-self-luminous type display device, the display device DPD may include a substrate, a circuit component layer, a display medium layer, a backlight module and other suitable component(s), wherein the backlight module may have a backlight source to provide backlight, the display medium layer may include any suitable display medium material (e.g., liquid crystal molecules), and the circuit component layer may be configured to control the status of the display medium of the display medium layer, so as to control the intensity of the light in each region, but not limited thereto. For example, when the display device DPD is the self-luminous type display device, the display device DPD may include a substrate, a circuit component layer and other suitable component(s), wherein the circuit component layer may include any suitable light emitting component (e.g., LED) and electronic component(s) configured to control the light emitting component, and the light emitting component may generate the light of which the intensity is corresponding to the signal, but not limited thereto. Note that a normal direction of the display device DPD and/or a normal direction of the substrate of the display device DPD may be parallel to the direction Z.

The display device DPD may be a color display device or a monochrome display device based on requirement(s), and the display device DPD may include the components and the structures corresponding to its type. For example, when the display device DPD is the color display device, the light emitting element(s) of the display device DPD (e.g., the backlight module of the non-self-luminous type display device or the light emitting component(s) of the self-luminous type display device) may directly generate lights with different colors, and a corresponding color image may be generated through the control of the signals (e.g., gray level signals), but not limited thereto. For example, when the display device DPD is the color display device, the light emitting element(s) of the display device DPD (e.g., the backlight module of the non-self-luminous type display device or the light emitting component(s) of the self-luminous type display device) may generate lights with the same color, the display device DPD may include a light conversion layer disposed on the light emitting element, the light conversion layer may convert (or filter) the light emitted from the light emitting element(s) (e.g., white light, blue light, etc.) into another light with different color, wherein the light conversion layer may include color filter, quantum dots material, fluorescence material, phosphorescence material, other suitable material(s) or a combination thereof, but not limited thereto. When the display device DPD is the monochrome display device, the light emitting element(s) of the display device DPD may generate lights with the same color, and the display device DPD may optionally include a light conversion layer, but not limited thereto.

The display region of the display device DPD may include a plurality of display pixels, and each display pixel may include at least one display sub-pixel. In some embodiments, if the display device DPD is the color display device, one display pixel may include a plurality of display sub-pixels for instance, such as a green display sub-pixel, a red display sub-pixel and a blue display sub-pixel, but not limited thereto. The number and color of the display sub-pixel(s) included in the display pixel may be adjusted based on requirement(s). In some embodiments, if the display device DPD is the monochrome display device, one display pixel may include one display sub-pixel for instance, but not limited thereto.

The display device DPD may have a peripheral region disposed on at least one outer side of the display region, and electronic component(s) configured to assist the display region (e.g., a gate driving circuit, a source driving circuit, integrated circuit, etc.) may be disposed in the peripheral region, but not limited thereto.

As shown in FIG. 1, the augmented reality electronic device ED may include a waveguide WG for guiding light. As shown in FIG. 1, the display light Ld generated by the display device DPD enters the waveguide WG, the user UR may simultaneously see the external image (the real world) and the display image IMp displayed by the display device DPD through the light-guiding effect of the waveguide WG.

In the present disclosure, the waveguide WG may have a light entrance part WGa and a light exit part WGb, the display light Ld generated by the display device DPD may enter the waveguide WG at the light entrance part WGa of the waveguide WG, and the display light Ld may emitted out the waveguide WG from the light exit part WGb of the waveguide WG, wherein the position of the light entrance part WGa and the position of the light exit part WGb may be designed based on requirement(s). For instance, the light entrance part WGa may be corresponding to the display device DPD, and the light exit part WGb may be corresponding to the viewing position of the user UR, but not limited thereto. For instance, in FIG. 1, the light entrance part WGa and the light exit part WGb may be respectively disposed on opposite sides of the waveguide WG in the direction Z, and the light entrance part WGa may not overlap the light exit part WGb in the direction Z, but not limited thereto. In the present disclosure, the display light Ld may undergo at least one reflection and/or at least one refraction in the waveguide WG (i.e., between the light entrance part WGa and the light exit part WGb), wherein the number of the reflection and the number of the refraction undergone by the display light Ld in the waveguide WG may be designed based on requirement(s). For example, in FIG. 1, the display light Ld may undergo a plurality of reflections and at least one refraction in the waveguide WG, but not limited thereto.

As shown in FIG. 1, the waveguide WG may include any suitable structure and any suitable material, such that the display light Ld generated by the display device DPD may be reflected and/or refracted in the waveguide WG. For instance, the waveguide WG may include transparent plastic material, but not limited thereto. In FIG. 1, the waveguide WG may optionally include a first light-guiding structure LG1, and the first light-guiding structure LG1 and the light exit part WGb are respectively disposed on opposite sides of the waveguide WG in the direction Z. For example, the first light-guiding structure LG1 may overlap the light exit part WGb in the direction Z, but not limited thereto. In this embodiment (as shown in FIG. 1), the first light-guiding structure LG1 is configured to reflect the display light Ld to the light exit part WGb, so as to make the display light Ld emit out the waveguide WG; namely, the display light Ld may be reflected towards the light exit part WGb of the waveguide WG by the first light-guiding structure LG1, thereby emitting out the waveguide WG (i.e., the first light-guiding structure LG1 may cause the last reflection of the display light Ld before the display light Ld emits out the waveguide WG), but not limited thereto. For instance, the first light-guiding structure LG1 may have a microstructure and include suitable material(s) to cause the required light reflection effect. For instance, the microstructure may have recessed structure(s) and/or protruded structure(s), but not limited thereto.

In FIG. 1, the waveguide WG may optionally include a second light-guiding structure LG2 disposed at the light entrance part WGa, wherein the second light-guiding structure LG2 is configured to refract the display light Ld, so as to make the display light Ld be guided to the light exit part WGb, but not limited thereto. For example, the second light-guiding structure LG2 may have a microstructure and include suitable material(s) to cause the required light refraction effect. For example, the microstructure may have recessed structure(s) and/or protruded structure(s), but not limited thereto.

In some embodiments, in order to reduce the loss of the display light Ld in the waveguide WG (e.g., the loss of the light intensity), the waveguide WG may be properly designed so that the display light Ld may undergo the total reflection in the waveguide WG, wherein the number of the total reflection undergone by the display light Ld in the waveguide WG may be designed based on requirement(s).

Optionally, in FIG. 1, the augmented reality electronic device ED may include a display-light adjusting structure LA, the display light Ld generated by the display device DPD may pass through the display-light adjusting structure LA and then enter the waveguide WG at the light entrance part WGa of the waveguide WG, wherein the display-light adjusting structure LA may adjust the display light Ld, thereby enhancing the light-guiding effect of the waveguide WG for the display light Ld. In FIG. 1, the display-light adjusting structure LA may be disposed between the light entrance part WGa of the waveguide WG and the display device DPD, but not limited thereto. For instance, the display-light adjusting structure LA may be a lens (e.g., a convex lens), but not limited thereto.

In the augmented reality electronic device ED of the present disclosure, in order to enhance the quality of the combining image viewed by the user UR, the augmented reality electronic device ED may include a light adjusting component AC configured to adjust external light Lo related to the external image and entering the augmented reality electronic device ED, so as to increase the combination effect of the display image IMp displayed by the display device DPD and the external image. For example, the light adjusting component AC may be configured to decrease the intensity of the external light Lo, so as to increase the combination effect of the display image IMp displayed by the display device DPD and the external image (e.g., the user UR may see the clearer display image IMp), but not limited thereto. As shown in FIG. 1, the external light Lo may enter the light adjusting component AC to enter the augmented reality electronic device ED. For instance, the external light Lo may sequentially pass through the light adjusting component AC and the waveguide WG and then reach the eyes of the user UR, such that the user UR may simultaneously see the display image IMp displayed by the display device DPD and the external image, but not limited thereto. For example, the light transmittance of the light adjusting component AC may be adjusted through the electrical signals, so as to make the external image be adjusted, but not limited thereto. For instance, in FIG. 1, the external light Lo may pass through the first light-guiding structure LG1 of the waveguide WG, but not limited thereto.

The internal structure of the light adjusting component will be described below, but the light adjusting component of the present disclosure is not limited to the following.

Figure 2:
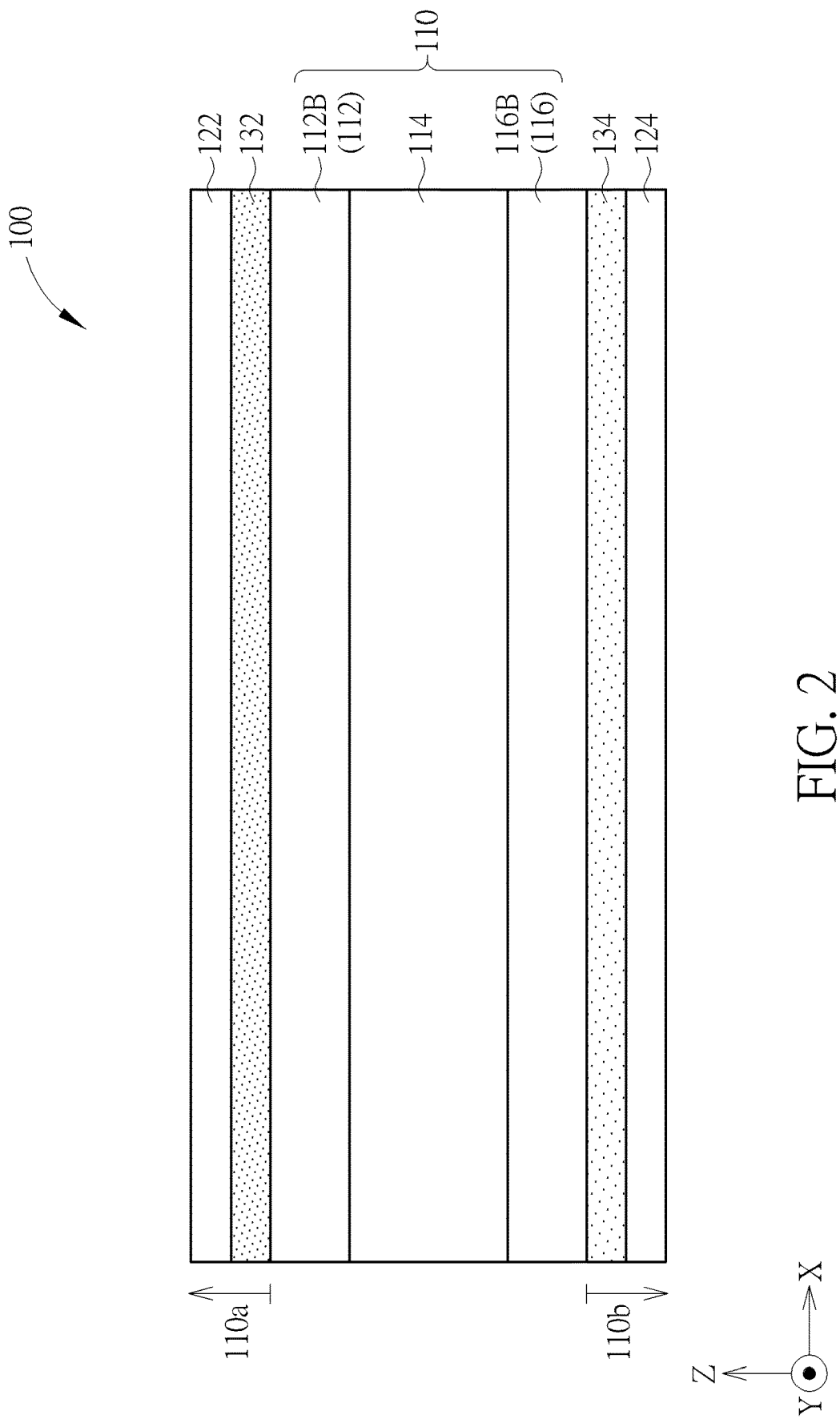
FIG. 2 is a schematic diagram showing a cross-sectional view of a light adjusting component of an augmented reality electronic device according to a first embodiment of the present disclosure.
Figure 3:
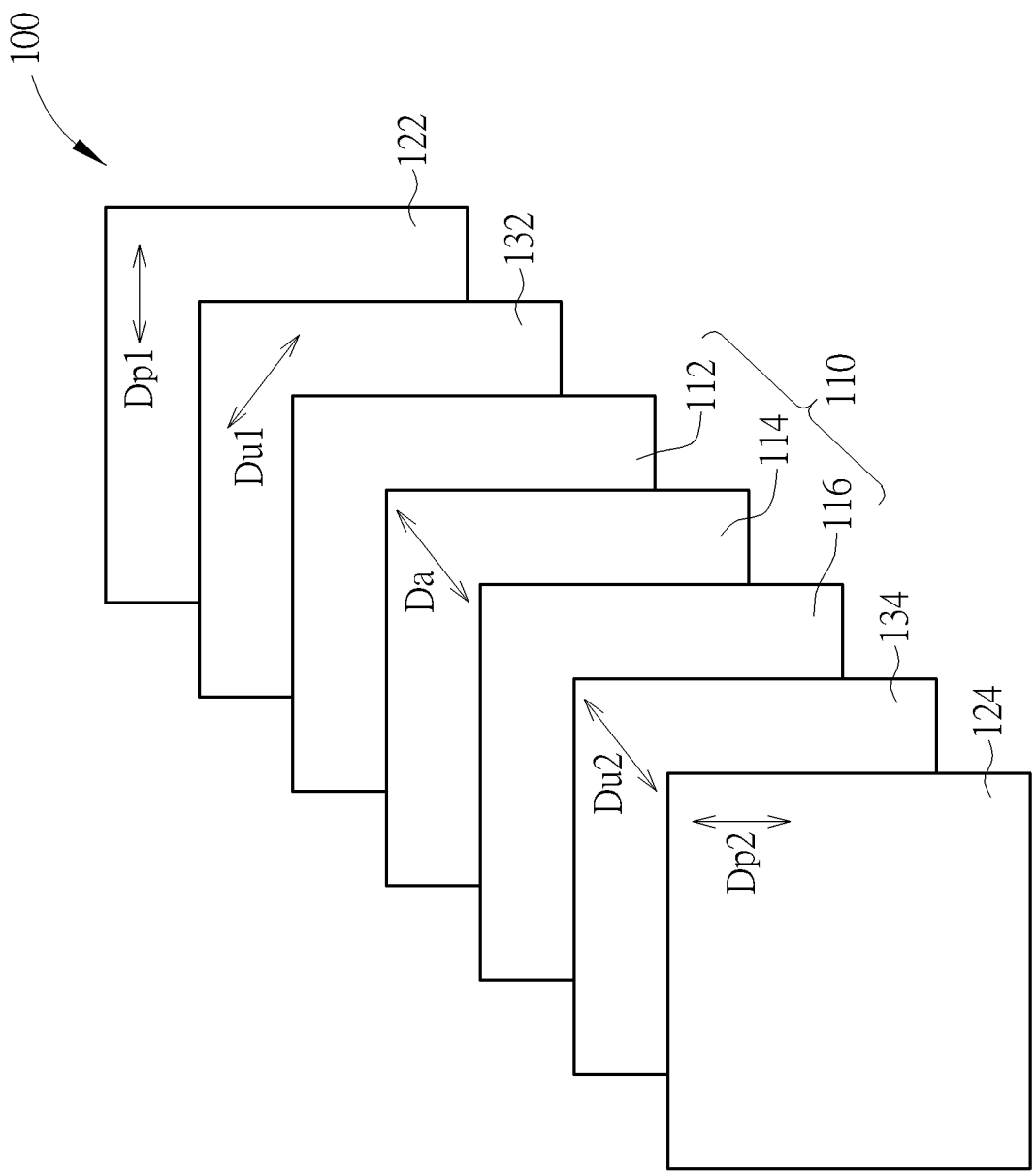
FIG. 3 is a schematic diagram showing characteristic-axis directions of films of the light adjusting component of the augmented reality electronic device according to the first embodiment of the present disclosure.

Referring to FIG. 2 and FIG. 3, FIG. 2 is a schematic diagram showing a cross-sectional view of a light adjusting component of an augmented reality electronic device according to a first embodiment of the present disclosure, and FIG. 3 is a schematic diagram showing characteristic-axis directions of films of the light adjusting component of the augmented reality electronic device according to the first embodiment of the present disclosure. As shown in FIG. 2 and FIG. 3, the light adjusting component 100 of this embodiment may include a panel 110 configured to adjust the light transmittance of the light adjusting component 100. In some embodiments, the light adjusting component 100 may include a plurality of light-adjusting pixels serving as smallest units for adjusting the light transmittance. Therefore, the light adjusting component 100 may adjust the light transmittances of each light-adjusting pixel (i.e., each region) based on requirement(s), thereby adjusting the external image seen by the user UR.

As shown in FIG. 2 and FIG. 3, the panel 110 may include a first substrate 112 and a second substrate 116 opposite to each other, wherein the first substrate 112 may include a first board 112B, and the second substrate 116 may include a second board 116B. The first substrate 112 and the second substrate 116 may individually be a rigid board or a flexible board. Based on the types of the first board 112B and the second board 116B, the first board 112B and the second board 116B may correspondingly include glass, quartz, ceramic, sapphire, polyimide (PI), polyethylene terephthalate (PET), other suitable materials or a combination thereof. Note that a normal direction of the first board 112B and a normal direction of the second board 116B may be parallel to the direction Z. In order to make FIG. 2 simple and clear, FIG. 2 only shows the first board 112B to represent the first substrate 112, and FIG. 2 only shows the second board 116B to represent the second substrate 116. In another embodiment, the first substrate 112 may further include at least one layer disposed on the first board 112B, and the second substrate 116 may further include at least one layer disposed on the second board 116B, but not limited thereto.

As shown in FIG. 2 and FIG. 3, the panel 110 may include a medium layer 114 disposed between the first substrate 112 and the second substrate 116. In the present disclosure, the medium layer 114 may include any suitable medium material(s), and the status of the medium material of the medium layer 114 may be adjusted by any suitable method, so as to adjust the light transmittance of the light adjusting component 100 (or, the light transmittances of each light-adjusting pixel of the light adjusting component 100). In some embodiments, the status of the medium material of the medium layer 114 may be controlled by electric field and/or electrical signal(s), so as to adjust the light transmittance of the light adjusting component 100 (or, the light transmittances of each light-adjusting pixel of the light adjusting component 100).

In some embodiments, the medium layer 114 may include a plurality of liquid crystal molecules for instance, but not limited thereto. The type of the panel 110 may be based on the type of the liquid crystal molecules of the medium layer 114, the arrangement of the liquid crystal molecules of the medium layer 114 and/or the driving method of the liquid crystal molecules of the medium layer 114. For example, according to the type of the liquid crystal molecules of the medium layer 114 and/or the driving method of the liquid crystal molecules of the medium layer 114, the panel 110 may be an electrically controlled birefringence (ECB) liquid crystal panel, an optically compensated birefringence (OCB) liquid crystal panel, a vertical alignment (VA) liquid crystal panel, a twisted nematic (TN) liquid crystal panel, an in plane switching (IPS) liquid crystal panel or other suitable liquid crystal panel. For example, in the structure of the light adjusting component 100 shown in FIG. 2 and FIG. 3, the panel 110 may be the ECB liquid crystal panel, the OCB liquid crystal panel or the VA liquid crystal panel, but not limited thereto.

As shown in FIG. 3, the medium layer 114 may have an alignment direction Da. In some embodiments, the liquid crystal molecules of the medium layer 114 is aligned, so as to make the medium layer 114 have the alignment direction Da. For example, the panel 110 may include at least one aligning layer (not shown in figures) disposed between the medium layer 114 and the first substrate 112 and/or disposed between the medium layer 114 and the second substrate 116, so as to make the medium layer 114 have the required alignment direction Da. For example, the alignment direction Da of the medium layer 114 may be a horizontal direction which is not parallel to the direction X and the direction Y, but not limited thereto.

In the present disclosure, electrode(s) configured to control the status of the medium material of the medium layer 114 may be designed based on requirement(s). For instance, a plurality of electrodes configured to control the medium layer 114 may be disposed on opposite sides of the medium layer 114 (i.e., the medium layer 114 is disposed between the electrodes); namely, two circuit layers containing the electrodes may be respectively included in the first substrate 112 and the second substrate 116 (e.g., one circuit layer may be disposed between the medium layer 114 and the first board 112B, and another circuit layer may be disposed between the medium layer 114 and the second board 116B), but not limited thereto. For instance, a plurality of electrodes configured to control the medium layer 114 may be disposed on the same side of the medium layer 114; namely, a circuit layer containing the electrodes may be included in the first substrate 112 or the second substrate 116 (e.g., the circuit layer may be disposed between the medium layer 114 and the first board 112B or disposed between the medium layer 114 and the second board 116B), but not limited thereto. Note that each light-adjusting pixel may have at least two electrodes configured to control the medium layer 114, so as to make a portion of medium material of the medium layer 114 corresponding to the light-adjusting pixel be adjusted according to the electrical signals received by the electrodes, thereby adjusting the light transmittance of the light-adjusting pixel, but not limited thereto.

In the first substrate 112 and/or the second substrate 116 of the present disclosure, the circuit layer containing the electrodes may include at least one conductive layer, at least one insulating layer, at least one semiconductor layer, other suitable layer(s) or a combination thereof. The material of the conductive layer may include metal, transparent conductive material (such as indium tin oxide (ITO), indium zinc oxide (IZO), etc.), other suitable conductive materials or a combination thereof, the material of the insulating layer may include such as silicon oxide ($SiO_x$), silicon nitride ($SiN_y$), silicon oxynitride ($SiO_xN_y$), organic insulating material (e.g., photosensitive resin), other suitable insulating material(s) or a combination thereof, and the material of the semiconductor layer may include such as poly-silicon, amorphous silicon, metal-oxide semiconductor (e.g., indium gallium zinc oxide), other suitable semiconductor materials or a combination thereof, but not limited thereto.

As shown in FIG. 1 and FIG. 2, the panel 110 has a first side 110a and a second side 110b opposite to each other in the direction Z, wherein the first side 110a may face the user UR (i.e., the waveguide WG is disposed on the first side 110a of the panel 110), and the second side 110b may face outside. Thus, the external light Lo enters the panel 110 at the second side 110b of the panel 110 and emits out the panel 110 at the first side 110a of the panel 110 (i.e., in FIG. 2, the external light Lo pass through the panel 110 from bottom to top), such that the user UR may see the external image on the first side 110a of the panel 110. In FIG. 2, the first substrate 112 is closer to the first side 110a of the panel 110 than the second substrate 116, and the second substrate 116 is closer to the second side 110b of the panel 110 than the first substrate 112. In another embodiment, the first side 110a of the present disclosure may face outside, and the second side may face the user UR, but not limited thereto.

In the present disclosure, the first side 110a of the panel 110 has a first reflectivity, and the second side 110b of the panel 110 has a second reflectivity. In some embodiments, the first reflectivity of the first side 110a of the panel 110 may be determined by the reflectivity of the first substrate 112, and the second reflectivity of the second side 110b of the panel 110 may be determined by the reflectivity of the second substrate 116, but not limited thereto. In some embodiments, the first reflectivity of the first side 110a of the panel 110 may be affected by the refractive index and reflectivity of the structures in the first substrate 112 (e.g., the first board 112B, the circuit layer and/or other structure(s) in the first substrate 112), and the second reflectivity of the second side 110b of the panel 110 may be affected by the refractive index and reflectivity of the structures in the second substrate 116 (e.g., the second board 116B, the circuit layer and/or other structure(s) in the second substrate 116), but not limited thereto. In some embodiments, the first reflectivity of the first side 110a of the panel 110 may be greater than the second reflectivity of the second side 110b of the panel 110 (e.g., the reflectivity of the first substrate 112 may be greater than the reflectivity of the second substrate 116). For example, the first substrate 112 of the panel 110 (e.g., the circuit layer of the first substrate 112) may include a plurality of metal lines (e.g., data lines, scan lines and/or peripheral metal traces of the panel 110), such that the first reflectivity may be greater than the second reflectivity, but not limited thereto.

In the present disclosure, the light adjusting component 100 may include a plurality of optical layers disposed at suitable positions, and characteristic axes of the optical layers (e.g., a transmission axis of a polarizer, a fast axis and a slow axis of a wave plate) may be designed based on requirement(s). In this description, a characteristic-axis direction of each optical layer may form a characteristic included angle with the same horizontal direction, so as to understand the relationship between the characteristic axes of the optical layers by these characteristic angles, wherein this horizontal direction may be the direction X for instance.

In FIG. 2 and FIG. 3, the optical layers of the light adjusting component 100 may include a first polarizer 122, a second polarizer 124, a first quarter wave plate 132 and a phase compensation film 134, wherein the first polarizer 122 and the first quarter wave plate 132 may be disposed on the first side 110a of the panel 110, and the second polarizer 124 and the phase compensation film 134 may be disposed on the second side 110b of the panel 110. In FIG. 2 and FIG. 3, the first substrate 112 may be disposed between the first quarter wave plate 132 and the medium layer 114, the first quarter wave plate 132 may be disposed between the first substrate 112 and the first polarizer 122, the second substrate 116 may be disposed between the phase compensation film 134 and the medium layer 114, and the phase compensation film 134 may be disposed between the second substrate 116 and the second polarizer 124. In the structure of the light adjusting component 100 shown in FIG. 2 and FIG. 3, the external light Lo related to the external image (as shown in FIG. 1) may sequentially pass through the second polarizer 124, the phase compensation film 134, the panel 110, the first quarter wave plate 132 and the first polarizer 122.

As shown in FIG. 3, the first polarizer 122 may have a first transmission-axis direction Dp1, the light passing through the first polarizer 122 may be a linear polarized light of which a polarization is parallel to the first transmission-axis direction Dp1, the second polarizer 124 may have a second transmission-axis direction Dp2, the light passing through the second polarizer 124 may be a linear polarized light of which a polarization is parallel to the second transmission-axis direction Dp2, and the first transmission-axis direction Dp1 may be perpendicular to the second transmission-axis direction Dp2. In FIG. 3, an included angle α1 between the first transmission-axis direction Dp1 of the first polarizer 122 and the direction X may be greater than or equal to 0 degrees and less than 180 degrees (i.e., $0° \le α1 < 180°$), and a difference between an included angle α2 between the second transmission-axis direction Dp2 of the second polarizer 124 and the direction X and the included angle α1 may be 90 degrees (i.e., $α2=α1±90°$).

The first quarter wave plate 132 may have a first slow-axis direction Du1 and a first fast-axis direction (not shown in figures) perpendicular to each other. When the polarized light passes through the first quarter wave plate 132, the retarding effect of the first quarter wave plate 132 causes a quarter-wavelength (λ/4) phase difference between a polarized light component parallel to the first fast-axis direction and a polarized light component parallel to the first slow-axis direction Du1. In FIG. 3, the first slow-axis direction Du1 of the first quarter wave plate 132 may be perpendicular to the alignment direction Da of the medium layer 114, but not limited thereto.

Since the wavelength of the visible light ranges from about 380 nm to about 800 nm, in some embodiments, a retardation amount of the quarter wave plate may range from 95 nm to 200 nm (i.e., 95 nm≤retardation amount≤200 nm), but not limited thereto. For instance, the retardation amount of the first quarter wave plate 132 shown in FIG. 2 and FIG. 3 may range from 121 nm to 159 nm (i.e., 121 nm≤retardation amount≤159 nm), but not limited thereto.

As shown in FIG. 1 to FIG. 3, a portion of the display light Ld generated by the display device DPD may pass through the waveguide WG (e.g., this portion of the display light Ld may pass through the first light-guiding structure LG1), and then, this portion of the display light Ld may be reflected to form an unwanted reflected light by the first substrate 112 of the panel 110 of the light adjusting component 100. In FIG. 2 and FIG. 3, since the first quarter wave plate 132 and the first polarizer 122 are disposed on the first side 110a of the panel 110 to make the first quarter wave plate 132 and the first polarizer 122 exist between the first substrate 112 of the panel 110 and the waveguide WG, the adverse effect(s) (e.g., a ghost image) caused by the unwanted reflected light and influencing the combining image viewed by the user UR may be reduced. In detail, after a portion of the display light Ld passes through the waveguide WG, this portion of the display light Ld passes through the first polarizer 122 to become a linear polarized light of which a polarization is parallel to the first transmission-axis direction Dp1, this linear polarized light passes through the first quarter wave plate 132 to become a circular polarized light, this circular polarized light is reflected by the first substrate 112 and then passes through the first quarter wave plate 132 again to become a reflected linear polarized light of which a polarization is symmetrical to the polarization of the previous linear polarized light based on the first slow-axis direction Du1, and finally, the light intensity of the reflected linear polarized light passing through the first polarizer 122 may be decreased due to the relation between the first transmission-axis direction Dp1 of the first polarizer 122 and the polarization of the reflected linear polarized light, thereby reducing the adverse effect(s) caused by the unwanted reflected light, enhancing the quality of the combining image and achieving the anti-reflection effect. In another embodiment, the first side 110a of the panel 110 may be closer to outside, such that the external light Lo related to the external image (as shown in FIG. 1) may sequentially pass through the first polarizer 122, the first quarter wave plate 132, the panel 110, the phase compensation film 134 and the second polarizer 124, but not limited thereto. Under this condition, since the phase compensation film 134 and the second polarizer 124 exist between the second substrate 116 of the panel 110 and the waveguide WG, the adverse effect(s) caused by the unwanted reflected light and influencing the combining image viewed by the user UR may be reduced, wherein the function of the phase compensation film 134 may be similar to or the same as the quarter wave plate, but not limited thereto.

In order to reduce the adverse effect(s) caused by the unwanted reflected light, as shown in FIG. 3, an included angle $θ_1$ may exist between the first slow-axis direction Du1 of the first quarter wave plate 132 and the first transmission-axis direction Dp1 of the first polarizer 122, such that an included angle γ1 between the first slow-axis direction Du1 of the first quarter wave plate 132 and the direction X may be a sum of the included angle α1 and the included angle $θ_1$ (i.e., $γ1=α1+θ_1$). For example, θ1 may range from 39 degrees to 51 degrees (i.e., $39° ≤ θ1 ≤ 51°$), so as to reduce the adverse effect(s) caused by the unwanted reflected light, but not limited thereto.

The phase compensation film 134 may have a second slow-axis direction Du2 and a second fast-axis direction (not shown in figures) perpendicular to each other. When the polarized light passes through the phase compensation film 134, the retarding effect of the phase compensation film 134 causes a suitable phase difference between a polarized light component parallel to the second fast-axis direction and a polarized light component parallel to the second slow-axis direction Du2. In FIG. 3, the second slow-axis direction Du2 of the phase compensation film 134 may be perpendicular to the first slow-axis direction Du1 of the first quarter wave plate 132, but not limited thereto. In FIG. 3, a difference between an included angle γ2 between the second slow-axis direction Du2 of the phase compensation film 134 and the direction X and the included angle γ1 may be 90 degrees (i.e., $γ2=γ1±90°$). In FIG. 3, the second slow-axis direction Du2 of the phase compensation film 134 may be parallel to the alignment direction Da of the medium layer 114 (i.e., an included angle φ between the alignment direction Da of the medium layer 114 and the direction X may be equal to the included angle γ2 between the second slow-axis direction Du2 of the phase compensation film 134 and the direction X), but not limited thereto.

In the present disclosure, the retardation amount of the phase compensation film 134 may be designed based on requirement(s). In some embodiments, according to the wavelength of the visible light, a retardation amount of the phase compensation film 134 may be greater than 0 and less than or equal to 200 nm (i.e., 0<retardation amount≤200 nm); namely, the phase compensation film 134 may be a quarter wave plate or a wave plate of which the retardation amount less than the quarter wave plate, but not limited thereto. In some embodiments, the phase difference of the phase compensation film 134 may be less than the phase difference of the first quarter wave plate 132.

For example, when the panel 110 is the ECB liquid crystal panel or the OCB liquid crystal panel, the retardation amount of the medium layer 114 may range from 10 nm to 70 nm (i.e., 10 nm≤retardation amount≤70 nm), the retardation amount of the first quarter wave plate 132 may range from 121 nm to 159 nm, and the retardation amount of the phase compensation film 134 may range from 51 nm to 149 nm (i.e., 51 nm≤retardation amount≤149 nm), but not limited thereto. For example, when the panel 110 is the VA liquid crystal panel, the retardation amount of the medium layer 114 may range from 0 nm to 20 nm (i.e., 0 nm≤retardation amount≤20 nm), the retardation amount of the first quarter wave plate 132 may range from 121 nm to 159 nm, and the retardation amount of the phase compensation film 134 may range from 101 nm to 159 nm (i.e., 101 nm≤retardation amount≤159 nm), but not limited thereto.

According to the design of the phase compensation film 134, in a region of the light adjusting component 100 which is in a dark state (e.g., the lowest light transmittance), the medium layer 114 of the panel 110 and the phase compensation film 134 may affect the external light Lo polarized by the second polarizer 124, so as to make a quarter-wavelength ($\lambda$/4) phase difference exist between the polarized light component parallel to the second fast-axis direction of the phase compensation film 134 and the polarized light component parallel to the second slow-axis direction Du2 of the phase compensation film 134. Moreover, since the second slow-axis direction Du2 of the phase compensation film 134 is perpendicular to the first slow-axis direction Du1 of the first quarter wave plate 132, in the region of the light adjusting component 100 which is in the dark state, the external light Lo polarized by the second polarizer 124 may become a circular polarized light after passing through the phase compensation film 134 and the medium layer 114, and this circular polarized light may become (or similarly become) a linear polarized light of which a polarization is parallel to the second transmission-axis direction Dp2 of the second polarizer 124 after passing through the first quarter wave plate 132 (i.e., the optical effects of the phase compensation film 134, the medium layer 114 and the first quarter wave plate 132 on the polarized external light Lo may cancel each other out), so as to improve the contrast of the image.

On the other hand, in a region of the light adjusting component 100 which is not in the dark state, the phase of the light passing through the medium layer 114 may be adjusted by adjusting the thickness of the medium layer 114 (i.e., cell gap) and/or adjusting the electrical signal to adjust status of the medium material in the medium layer 114, so as to generate the image with high quality.

The augmented reality electronic device of the present disclosure is not limited to the above embodiments. Further embodiments of the present disclosure are described below. For ease of comparison, same components will be labeled with the same symbol in the following. The following descriptions relate the differences between each of the embodiments, and repeated parts will not be redundantly described.

Figure 4:
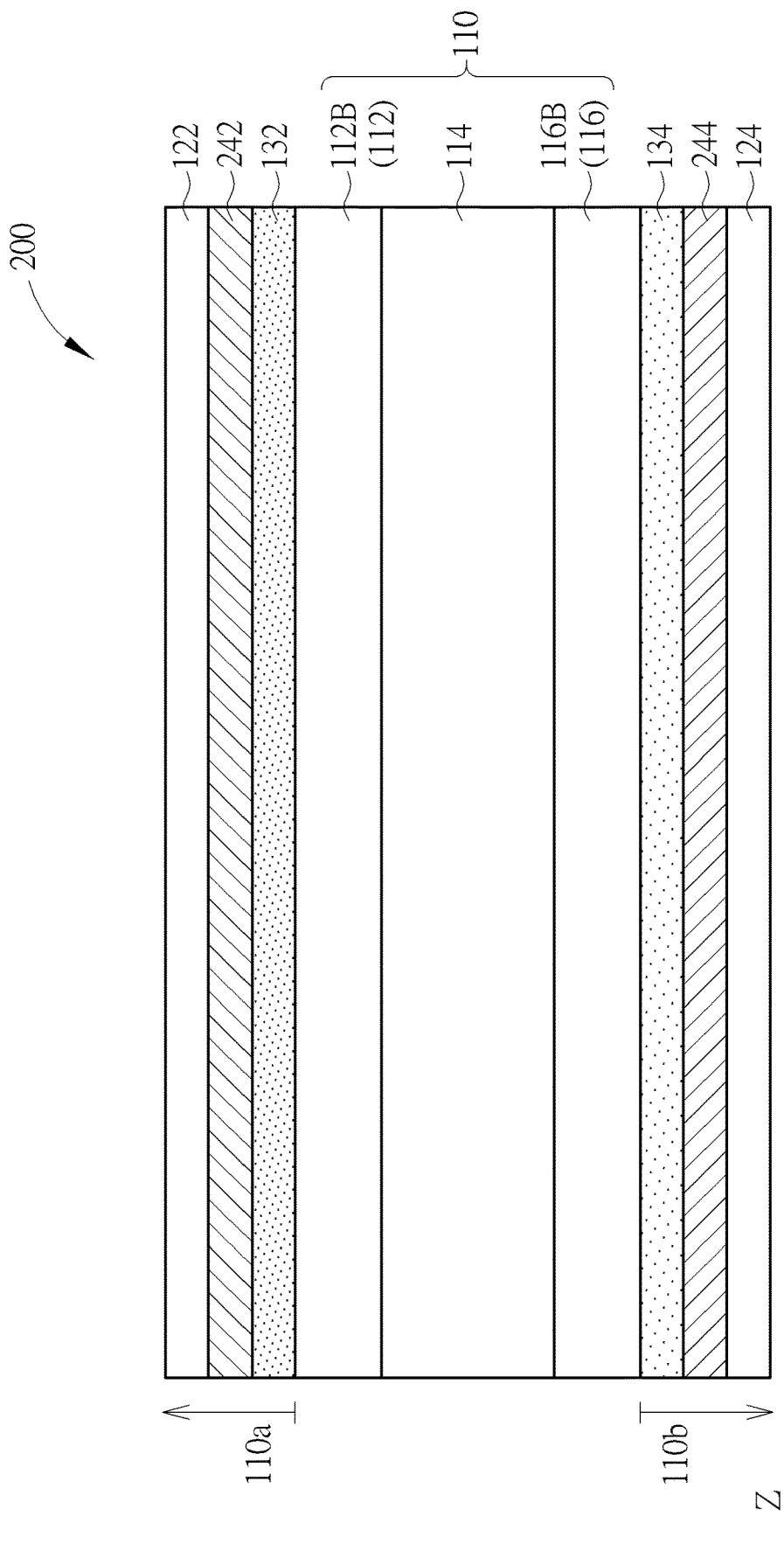
FIG. 4 is a schematic diagram showing a cross-sectional view of a light adjusting component of an augmented reality electronic device according to a second embodiment of the present disclosure.
Figure 5:
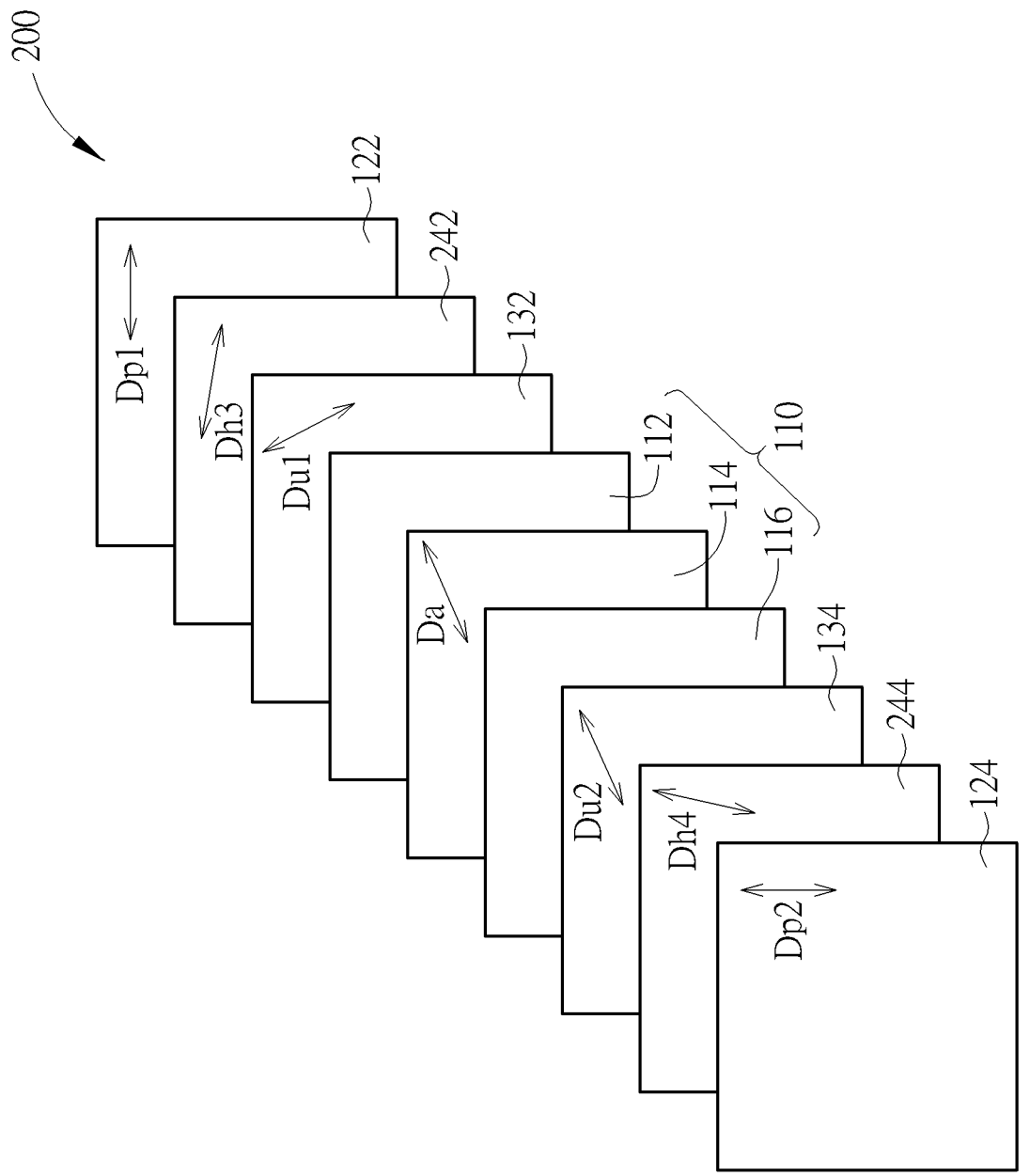
FIG. 5 is a schematic diagram showing characteristic-axis directions of films of the light adjusting component of the augmented reality electronic device according to the second embodiment of the present disclosure.

Referring to FIG. 4 and FIG. 5, FIG. 4 is a schematic diagram showing a cross-sectional view of a light adjusting component of an augmented reality electronic device according to a second embodiment of the present disclosure, and FIG. 5 is a schematic diagram showing characteristic-axis directions of films of the light adjusting component of the augmented reality electronic device according to the second embodiment of the present disclosure. As shown in FIG. 4 and FIG. 5, a difference between this embodiment and the first embodiment is that the optical layers of the light adjusting component 200 of this embodiment further includes a first half wave plate 242 and a second half wave plate 244, wherein the first half wave plate 242 is disposed on the first side 110a of the panel 110, the second half wave plate 244 is disposed on the second side 110b of the panel 110. In FIG. 4 and FIG. 5, the first half wave plate 242 may be disposed between the first quarter wave plate 132 and the first polarizer 122, and the second half wave plate 244 may be disposed between the phase compensation film 134 and the second polarizer 124. In the structure of the light adjusting component 200 shown in FIG. 4 and FIG. 5, the external light Lo related to the external image (as shown in FIG. 1) may sequentially pass through the second polarizer 124, the second half wave plate 244, the phase compensation film 134, the panel 110, the first quarter wave plate 132, the first half wave plate 242 and the first polarizer 122. In another embodiment, the first side 110a of the panel 110 may be closer to outside, and therefore, the external light Lo related to the external image (as shown in FIG. 1) may sequentially pass through the first polarizer 122, the first half wave plate 242, the first quarter wave plate 132, the panel 110, the phase compensation film 134, the second half wave plate 244 and the second polarizer 124, but not limited thereto.

The first half wave plate 242 may have a third slow-axis direction Dh3 and a third fast-axis direction (not shown in figures) perpendicular to each other. When the polarized light passes through the first half wave plate 242, the retarding effect of the first half wave plate 242 causes a half-wavelength ($\lambda$/2) phase difference between a polarized light component parallel to the third fast-axis direction and a polarized light component parallel to the third slow-axis direction Dh3. The second half wave plate 244 may have a fourth slow-axis direction Dh4 and a fourth fast-axis direction (not shown in figures) perpendicular to each other. When the polarized light passes through the second half wave plate 244, the retarding effect of the second half wave plate 244 causes a half-wavelength ($\lambda$/2) phase difference between a polarized light component parallel to the fourth fast-axis direction and a polarized light component parallel to the fourth slow-axis direction Dh4. In this embodiment, the third slow-axis direction Dh3 of the first half wave plate 242 may be perpendicular to the fourth slow-axis direction Dh4 of the second half wave plate 244.

A portion of the display light Ld generated by the display device DPD may pass through the waveguide WG (e.g., this portion of the display light Ld may pass through the first light-guiding structure LG1), and then, this portion of the display light Ld may be reflected to form an unwanted reflected light by the first substrate 112 of the panel 110 of the light adjusting component 200. In FIG. 4 and FIG. 5, since the first quarter wave plate 132, the first half wave plate 242 and the first polarizer 122 are disposed on the first side 110a of the panel 110 to make the first quarter wave plate 132, the first half wave plate 242 and the first polarizer 122 exist between the first substrate 112 of the panel 110 and the waveguide WG, the adverse effect(s) (e.g., a ghost image) caused by the unwanted reflected light and influencing the combining image viewed by the user UR may be reduced. In detail, after a portion of the display light Ld passes through the waveguide WG, this portion of the display light Ld passes through the first polarizer 122 to become a linear polarized light of which a polarization is parallel to the first transmission-axis direction Dp1, this linear polarized light sequentially passes through the first half wave plate 242 and the first quarter wave plate 132 to become a circular polarized light, this circular polarized light is reflected by the first substrate 112 and then sequentially passes through the first quarter wave plate 132 and the first half wave plate 242 again to become a reflected linear polarized light of which a polarization is not parallel to the first transmission-axis direction Dp1, and finally, the light intensity of the reflected linear polarized light passing through the first polarizer 122 may be decreased due to the relation between the first transmission-axis direction Dp1 of the first polarizer 122 and the polarization of the reflected linear polarized light. Moreover, in FIG. 4 and FIG. 5, the first half wave plate 242 may adjust and/or compensate the phase of the light of each color, and therefore, after the light of each color passes through the first quarter wave plate 132 twice, the first half wave plate 242 twice and the first polarizer 122, the light intensity of the unwanted reflected light emitting out the light adjusting component 200 may be further reduced, thereby reducing the adverse effect(s) caused by the unwanted reflected light, enhancing the quality of the combining image and achieving the anti-reflection effect.

In order to reduce the adverse effect(s) caused by the unwanted reflected light, in FIG. 5, an included angle $\theta_2$ may exist between the third slow-axis direction Dh3 of the first half wave plate 242 and the first transmission-axis direction Dp1 of the first polarizer 122, such that an included angle $\beta 1$ between the third slow-axis direction Dh3 of the first half wave plate 242 and the direction X may be a sum of the included angle $\alpha 1$ and the included angle $\theta_2$ (i.e., $\beta 1 = \alpha 1 + \theta_2$). An included angle $2\theta_2 + \theta_3$ may exist between the first slow-axis direction Du1 of the first quarter wave plate 132 and the first transmission-axis direction Dp1 of the first polarizer 122, such that the included angle $\gamma 1$ between the first slow-axis direction Du1 of the first quarter wave plate 132 and the direction X may be a sum of the included angle $\alpha 1$ and the included angle $2\theta_2 + \theta_3$ (i.e., $\gamma 1 = \alpha 1 + 2\theta_2 + \theta_3$). For example, $\theta_2$ may range from 5 degrees to 29 degrees (i.e., $5° \leq \theta_2 \leq 29°$, and $\theta_3$ may range from 42 degrees to 49 degrees (i.e., $42° \leq \theta_3 < 49°$), so as to reduce the adverse effect(s) caused by the unwanted reflected light, but not limited thereto. In FIG. 5, a difference between an included angle $\beta_2$ between the fourth slow-axis direction Dh4 of the second half wave plate 244 and the direction X and the included angle $\beta 1$ may be 90 degrees (i.e., $\beta 2 = \beta 1 \pm 90°$).

Since the wavelength of the visible light ranges from about 380 nm to about 800 nm, in some embodiments, the retardation amount of the quarter wave plate may range from 95 nm to 200 nm (i.e., 95 nm retardation amount≤200 nm), a retardation amount of the half wave plate may range from 190 nm to 400 nm (i.e., 190 nm≤retardation amount≤400 nm), but not limited thereto. For instance, in FIG. 4 and FIG. 5, the retardation amount of the first quarter wave plate 132 may range from 129 nm to 154 nm (i.e., 129 nm≤retardation amount≤154 nm), the retardation amount of the first half wave plate 242 and the retardation amount of the second half wave plate 244 may range from 249 nm to 301 nm (i.e., 249 nm≤retardation amounts≤301 nm), but not limited thereto. For instance, the retardation amount of the first half wave plate 242 may be equal to the retardation amount of the second half wave plate 244, but not limited thereto. In some embodiments, according to the wavelength of the visible light, the retardation amount of the phase compensation film 134 may be greater than 0 and less than or equal to 200 nm; namely, the phase compensation film 134 may be a quarter wave plate or a wave plate of which the retardation amount less than the quarter wave plate, but not limited thereto.

In the structure of the light adjusting component 200 shown in FIG. 4 and FIG. 5, the panel 110 may be the ECB liquid crystal panel, the OCB liquid crystal panel or the VA liquid crystal panel.

For example, when the panel 110 is the ECB liquid crystal panel or the OCB liquid crystal panel, the retardation amount of the medium layer 114 may range from 10 nm to 70 nm (i.e., 10 nm retardation amount 70 nm), the retardation amount of the first quarter wave plate 132 may range from 129 nm to 154 nm, and the retardation amount of the phase compensation film 134 may range from 59 nm to 144 nm (i.e., 59 nm retardation amount 144 nm), but not limited thereto. For example, when the panel 110 is the VA liquid crystal panel 110, the retardation amount of the medium layer 114 may range from 0 nm to 20 nm (i.e., 0 nm retardation amount 20 nm), the retardation amount of the first quarter wave plate 132 may range from 129 nm to 154 nm, and the retardation amount of the phase compensation film 134 may range from 109 nm to 154 nm (i.e., 109 nm retardation amount 154 nm), but not limited thereto.

According to the design of the phase compensation film 134, in a region of the light adjusting component 200 which is in a dark state, the medium layer 114 of the panel 110 and the phase compensation film 134 may affect the external light Lo polarized by the second polarizer 124 and passing through the second half wave plate 244, so as to make a quarter-wavelength ($\lambda/4$) phase difference exist between the polarized light component parallel to the second fast-axis direction of the phase compensation film 134 and the polarized light component parallel to the second slow-axis direction Du2 of the phase compensation film 134. Moreover, since the second slow-axis direction Du2 of the phase compensation film 134 is perpendicular to the first slow-axis direction Du1 of the first quarter wave plate 132, and the fourth slow-axis direction Dh4 of the second half wave plate 244 is perpendicular to the third slow-axis direction Dh3 of the first half wave plate 242, in the region of the light adjusting component 200 which is in the dark state, the external light Lo polarized by the second polarizer 124 and passing through the second half wave plate 244 may become a circular polarized light after passing through the phase compensation film 134 and the medium layer 114, this circular polarized light may become (or similarly become) a linear polarized light after passing through the first quarter wave plate 132, and this linear polarized light may become (or similarly become) another linear polarized light of which a polarization is parallel to the second transmission-axis direction Dp2 of the second polarizer 124 after passing through the first half wave plate 242, so as to decrease the luminance of the dark state and improve the contrast of the image.

On the other hand, in a region of the light adjusting component 200 which is not in the dark state, the phase of the light passing through the medium layer 114 may be adjusted by adjusting the thickness of the medium layer 114 (i.e., cell gap) and/or adjusting the electrical signal to adjust status of the medium material in the medium layer 114, so as to generate the image with high quality.

Figure 6:
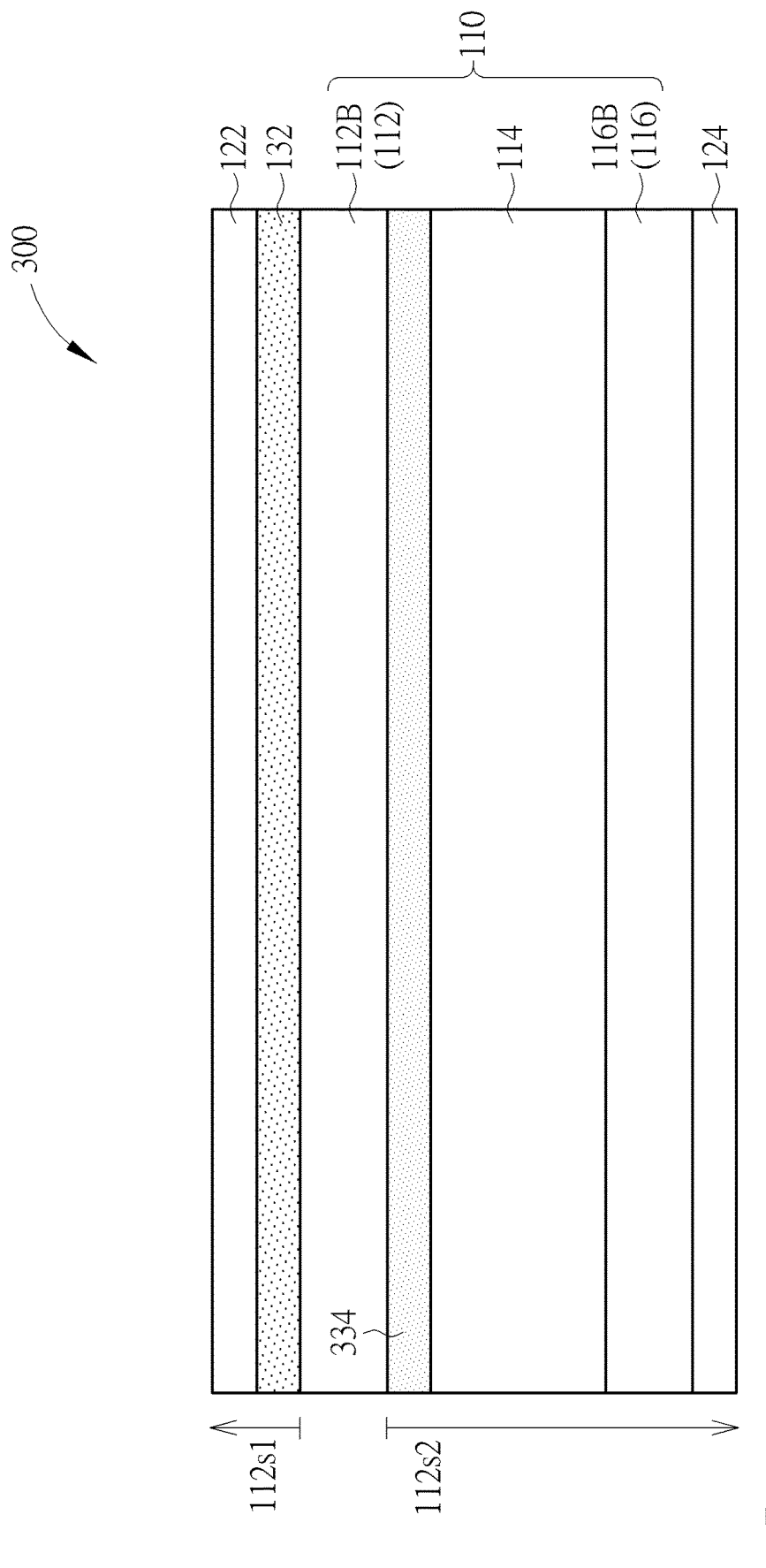
FIG. 6 is a schematic diagram showing a cross-sectional view of a light adjusting component of an augmented reality electronic device according to a third embodiment of the present disclosure.
Figure 7:
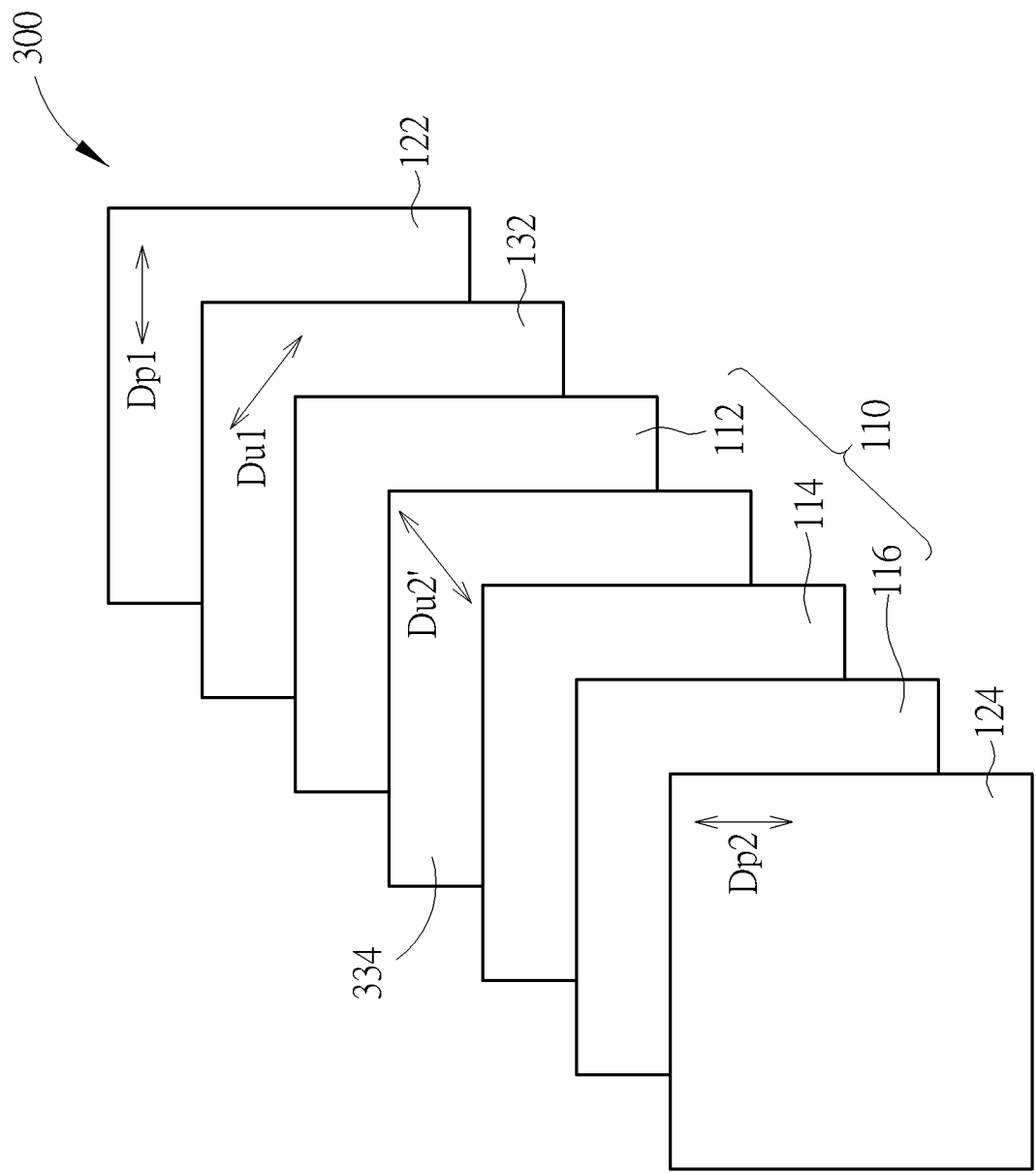
FIG. 7 is a schematic diagram showing characteristic-axis directions of films of the light adjusting component of the augmented reality electronic device according to the third embodiment of the present disclosure.

Referring to FIG. 6 and FIG. 7, FIG. 6 is a schematic diagram showing a cross-sectional view of a light adjusting component of an augmented reality electronic device according to a third embodiment of the present disclosure, and FIG. 7 is a schematic diagram showing characteristic-axis directions of films of the light adjusting component of the augmented reality electronic device according to the third embodiment of the present disclosure. As shown in FIG. 6 and FIG. 7, a difference between this embodiment and the first embodiment is the type of the panel 110 and the design of the optical layers. For instance, in the structure of the light adjusting component 300 shown in FIG. 6 and FIG. 7, the panel 110 may be the TN liquid crystal panel or the IPS liquid crystal panel, but not limited thereto. In some embodiments, the reflectivity of the first substrate 112 may be greater than the reflectivity of the second substrate 116. For example, the first substrate 112 of the panel 110 (e.g., the circuit layer of the first substrate 112) may include a plurality of metal lines (e.g., data lines, scan lines and/or peripheral metal traces of the panel 110), such that the reflectivity of the first substrate 112 may be greater than the reflectivity of the second substrate 116, but not limited thereto.

In FIG. 6 and FIG. 7, the optical layers of the light adjusting component 300 may include a first polarizer 122, a second polarizer 124, a first quarter wave plate 132 and a second quarter wave plate 334, wherein the first polarizer 122 and the first quarter wave plate 132 may be disposed on a first side 112s1 of the first substrate 112, and the second polarizer 124 and the second quarter wave plate 334 may be disposed on a second side 112s2 of the first substrate 112. The first side 112s1 and the second side 112s2 of the first substrate 112 may be opposite to each other in the direction Z, wherein the first side 112s1 may face the user UR (i.e., the waveguide WG is disposed on the first side 112s1 of the first substrate 112), the second side 112s2 may face outside, such that the external light Lo enters the first substrate 112 at the second side 112s2 of the first substrate 112 and emits out the first substrate 112 at the first side 112s1 of the first substrate 112 (i.e., in FIG. 6, the external light Lo pass through the panel 110 from bottom to top), and the user UR may see the external image on the first side 112s1 of the first substrate 112. In another embodiment of the present disclosure, the first side 112s1 may face outside, and the second side 112s2 may face the user UR, but not limited thereto.

In FIG. 6 and FIG. 7, the first substrate 112 may be disposed between the first quarter wave plate 132 and the second quarter wave plate 334, the first quarter wave plate 132 may be disposed between the first substrate 112 and the first polarizer 122, the second quarter wave plate 334 may be disposed between the first substrate 112 and the medium layer 114 (i.e., the second quarter wave plate 334 may be disposed between the first substrate 112 and the second substrate 116 of the panel 110), and the second substrate 116 may be disposed between the medium layer 114 and the second polarizer 124. In the structure of the light adjusting component 300 shown in FIG. 6 and FIG. 7, the external light Lo related to the external image (as shown in FIG. 1) may sequentially pass through the second polarizer 124, the second substrate 116, the medium layer 114, the second quarter wave plate 334, the first substrate 112, the first quarter wave plate 132 and the first polarizer 122.

The designs of the first quarter wave plate 132, the first polarizer 122 and the second polarizer 124 (e.g., the characteristic axis, the included angle between the characteristic axis and the direction X, the retardation amount, etc.) of this embodiment may be referred to the first embodiment, these parts will not be redundantly described. The second quarter wave plate 334 of this embodiment may have a second slow-axis direction Du2' and a second fast-axis direction (not shown in figures) perpendicular to each other. When the polarized light passes through the second quarter wave plate 334, the retarding effect of the second quarter wave plate 334 causes a quarter-wavelength (λ/4) phase difference between a polarized light component parallel to the second fast-axis direction and a polarized light component parallel to the second slow-axis direction Du2'. In this embodiment, the second slow-axis direction Du2' of the second quarter wave plate 334 may be perpendicular to the first slow-axis direction Du1 of the first quarter wave plate 132, such that a difference between an included angle γ2' between the second slow-axis direction Du2' of the second quarter wave plate 334 and the direction X and the included angle γ1 may be 90 degrees (i.e., γ2'=γ1±90°), but not limited thereto. Furthermore, in some embodiments, the alignment direction of the medium layer 114 of the panel 110 may not be parallel to or not be perpendicular to the characteristic axes of the optical layers, but not limited thereto.

Since the wavelength of the visible light ranges from about 380 nm to about 800 nm, in some embodiments, a retardation amount of the second quarter wave plate 334 may range from 95 nm to 200 nm (i.e., 95 nm≤retardation amount≤200 nm), but not limited thereto. For instance, the retardation amount of the second quarter wave plate 334 of this embodiment may range from 121 nm to 159 nm (i.e., 121 nm≤retardation amount≤159 nm), but not limited thereto. For instance, in this embodiment, the retardation amount (phase difference) of the second quarter wave plate 334 may be equal to the retardation amount (phase difference) of the first quarter wave plate 132, but not limited thereto.

In the embodiment shown in FIG. 6 and FIG. 7, the first quarter wave plate 132 and the first polarizer 122 disposed on the first side 112s1 of the first substrate 112 may reduce the adverse effect(s) caused by the unwanted reflected light. The detail of this part may be referred to the first embodiment, and this part will not be redundantly described.

When the panel 110 is the TN liquid crystal panel and the IPS liquid crystal panel, if the external light Lo enters the medium layer 114 after the external light Lo is polarized and adjusted to become a circular polarized light, the arrangement of the liquid crystal molecules of the medium layer 114 may cause unnecessary optical effect(s) on the circular polarized light (e.g., the polarization state of the circular polarized light may be changed), so as to make the light transmittance of the light adjusting component 300 be unexpected and generate display problem(s). Therefore, in the structure of the light adjusting component 300 shown in FIG. 6 and FIG. 7, the second quarter wave plate 334 is disposed between the medium layer 114 and the first substrate 112, such that there is no other layer which would change the polarization state of light between the second polarizer 124 and the medium layer 114, so as to make the linear polarized light directly enter the medium layer 114, thereby increasing the quality of the image viewed by the user UR.

Figure 8:
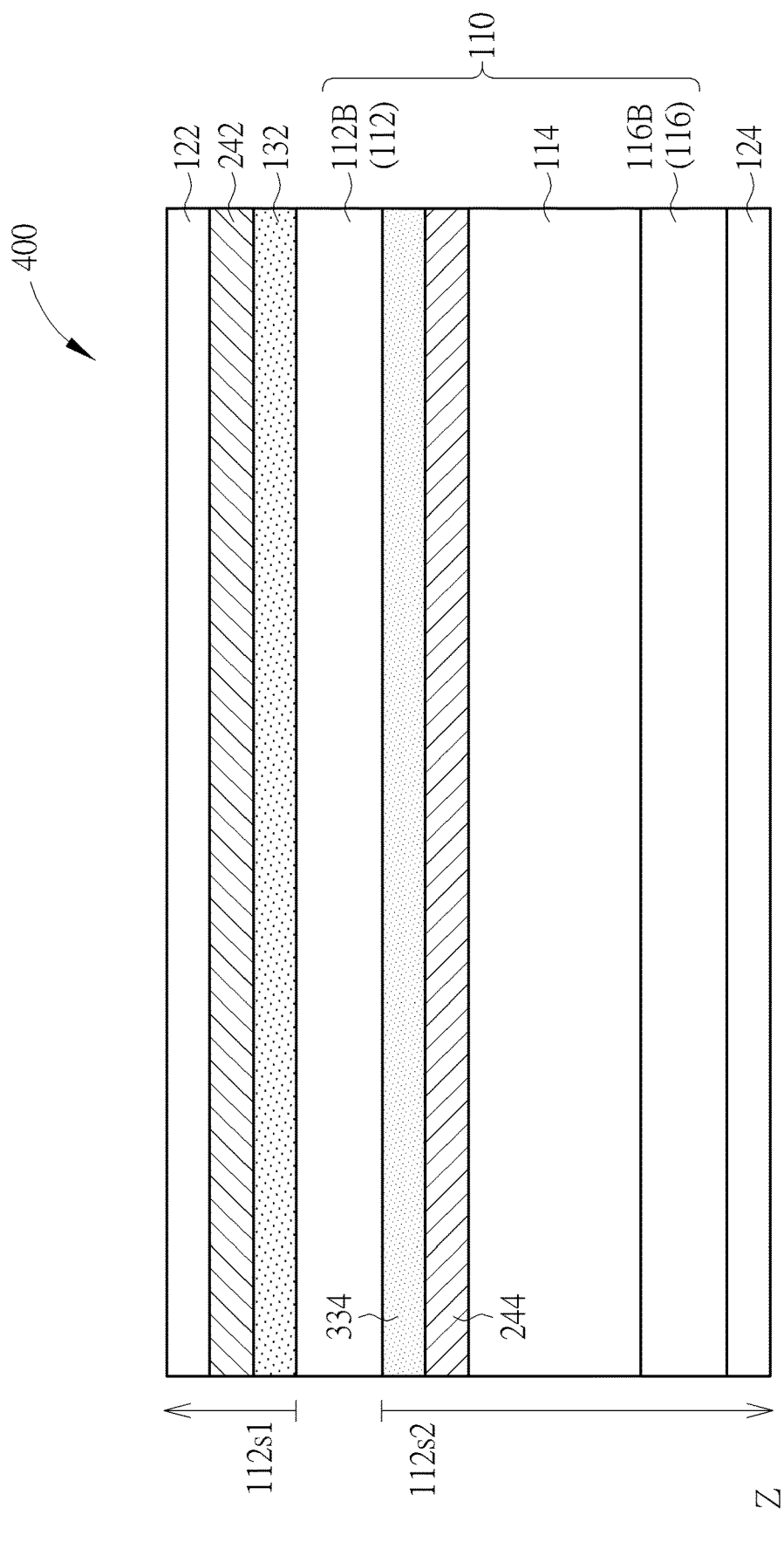
FIG. 8 is a schematic diagram showing a cross-sectional view of a light adjusting component of an augmented reality electronic device according to a fourth embodiment of the present disclosure.

Referring to FIG. 8, FIG. 8 is a schematic diagram showing a cross-sectional view of a light adjusting component of an augmented reality electronic device according to a fourth embodiment of the present disclosure. As shown in FIG. 8, a difference between this embodiment and the third embodiment is that the optical layers of the light adjusting component 400 of this embodiment further includes a first half wave plate 242 and a second half wave plate 244, wherein the first half wave plate 242 may be disposed on the first side 112s1 of the first substrate 112, and the second half wave plate 244 may be disposed on the second side 112s2 of the first substrate 112. In FIG. 8, the first half wave plate 242 may be disposed between the first quarter wave plate 132 and the first polarizer 122, and the second half wave plate 244 may be disposed between the second quarter wave plate 334 and the medium layer 114 (i.e., the second quarter wave plate 334 and the second half wave plate 244 may be disposed between the first substrate 112 and the second substrate 116 of the panel 110). In the structure of the light adjusting component 400 shown in FIG. 8, the external light Lo related to the external image may sequentially pass through the second polarizer 124, the second substrate 116, the medium layer 114, the second half wave plate 244, the second quarter wave plate 334, the first substrate 112, the first quarter wave plate 132, the first half wave plate 242 and the first polarizer 122.

The designs of the first quarter wave plate 132, the first polarizer 122, the second polarizer 124, the first half wave plate 242 and the second half wave plate 244 (e.g., the characteristic axis, the included angle between the characteristic axis and the direction X, the retardation amount, etc.) of this embodiment may be referred to the second embodiment, these parts will not be redundantly described. The characteristic axis of the second quarter wave plate 334 and the characteristic-axes relation of the second quarter wave plate 334 and the first quarter wave plate 132 may be referred to the third embodiment, these parts will not be redundantly described. In this embodiment, a retardation amount of the second quarter wave plate 334 may range from 129 nm to 154 nm (i.e., 129 nm≤retardation amount≤154 nm), but not limited thereto. For example, in this embodiment, the retardation amount (phase difference) of the second quarter wave plate 334 may be equal to the retardation amount (phase difference) of the first quarter wave plate 132, but not limited thereto.

In the embodiment shown in FIG. 8, the first quarter wave plate 132, the first half wave plate 242 and the first polarizer 122 disposed on the first side 112s1 of the first substrate 112 may reduce the adverse effect(s) caused by the unwanted reflected light. The detail of this part may be referred to the second embodiment, and this part will not be redundantly described.

In this embodiment, owing to the existences of the first half wave plate 242 and the second half wave plate 244, the phase of the light of each color may be adjusted and/or compensated, such that the optical effect(s) may be improved because of the combination of the first half wave plate 242, the second half wave plate 244, the first quarter wave plate 132, the second quarter wave plate 334, the first polarizer 122 and the second polarizer 124, thereby reducing the adverse effect(s) caused by the unwanted reflected light, enhancing the quality of the combining image and achieving the anti-reflection effect of the light adjusting component 400.

The detecting method of detecting the structures in the light adjusting component will be described below, and the detecting method is applicable to the light adjusting component of any of the aforementioned embodiments (in the following, the light adjusting component is the light adjusting component 100 of the first embodiment for example). Note that the detecting method is not limited to the following, and the structures in the light adjusting component would be detected in any suitable method.

In the present disclosure, the optical layers (e.g., the polarizer, the quarter wave plate, the half wave plate and the phase compensation film 134) may be removed from the light adjusting component 100, and the removed optical layers may be detected by any suitable instrument, so as to detect the directions of their characteristic axes (e.g., the transmission axis of the polarizer, the fast axis and the slow axis of the wave plate, the fast axis and the slow axis of the phase compensation film 134, etc.) and their retardation amount. In some embodiments, the removed optical layers may be detected by phase difference detection instrument(s). For instance, the phase difference detection instrument may be AxoScan (AxoScan is made by Axometrics), PLST40-2R (PLST40-2R is made by Phot Optoelectronics Corporation) or other suitable instrument.

In the present disclosure, the optical layers (e.g., the polarizer, the quarter wave plate, the half wave plate and the phase compensation film 134) may be removed from the light adjusting component 100, and the alignment direction Da and the retardation amount of the medium layer 114 of the panel 110 may be detected by any suitable instrument. In some embodiments, the medium layer 114 of the panel 110 may be detected by phase difference detection instrument(s). For instance, the phase difference detection instrument may be AxoScan (AxoScan is made by Axometrics), RETS (RETS is made by Otsuka Tech Electronics Corporation) or other suitable instrument. In some embodiments, the alignment direction Da of the medium layer 114 may be detected by an optical microscope (OM) or a scanning electron microscope (SEM).

In the present disclosure, the optical layers (e.g., the polarizer, the quarter wave plate, the half wave plate and the phase compensation film 134) may be removed from the light adjusting component 100, the reflectivity of the first substrate 112 of the panel 110 and the reflectivity of the second substrate 116 of the panel 110 may be detected by any suitable instrument in the condition that the medium layer 114 still exists between the first substrate 112 and the second substrate 116. For example, the reflectivity of the first substrate 112 and the reflectivity of the second substrate 116 may be detected by a handheld reflectometer, a spectrophotometer or other suitable instrument, wherein the spectrophotometer may be a spectrometer or CM2600d (CM2600d is made by Konica Minolta).

In summary, in the augmented reality electronic device of the present disclosure, the light adjusting component may have the anti-reflection effect and/or the contrast-improved effect, so as to enhance the quality of the image viewed by the user.

Although the embodiments and their advantages of the present disclosure have been described as above, it should be understood that any person having ordinary skill in the art can make changes, substitutions, and modifications without departing from the spirit and scope of the present disclosure. In addition, the protecting scope of the present disclosure is not limited to the processes, machines, manufactures, material compositions, devices, methods and steps in the specific embodiments described in the description. Any person having ordinary skill in the art can understand the current or future developed processes, machines, manufactures, material compositions, devices, methods and steps from the content of the present disclosure, and then, they can be used according to the present disclosure as long as the same functions can be implemented or the same results can be achieved in the embodiments described herein. Thus, the protecting scope of the present disclosure includes the above processes, machines, manufactures, material compositions, devices, methods and steps. Moreover, each claim constitutes an individual embodiment, and the protecting scope of the present disclosure also includes the combination of each claim and each embodiment. The protecting scope of the present disclosure shall be determined by the appended claims.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An augmented reality electronic device, comprising:
a light adjusting component, comprising:
a panel comprising a first substrate, a second substrate and a medium layer disposed between the first substrate and the second substrate; and
a first quarter wave plate disposed on a first side of the panel,
wherein the panel has a second side opposite to the first side, the first side has a first reflectivity, the second side has a second reflectivity, and the first reflectivity is greater than the second reflectivity,
wherein the medium layer has an alignment direction, the first quarter wave plate has a first slow-axis direction, and the alignment direction is perpendicular to the first slow-axis direction.

2. The augmented reality electronic device according to claim 1, wherein the light adjusting component further comprises a phase compensation film disposed on the second side of the panel, wherein the phase compensation film has a second slow-axis direction, the first slow-axis direction of the first quarter wave plate is perpendicular to the second slow-axis direction of the phase compensation film.

3. The augmented reality electronic device according to claim 2, wherein a phase difference of the phase compensation film is less than a phase difference of the first quarter wave plate.

4. The augmented reality electronic device according to claim 3, wherein the first substrate is disposed between the medium layer and the first quarter wave plate, and the first substrate comprises a plurality of metal lines.

5. The augmented reality electronic device according to claim 3, wherein the second substrate is disposed between the medium layer and the phase compensation film.

6. The augmented reality electronic device according to claim 1, wherein the medium layer comprises a plurality of liquid crystal molecules.

7. The augmented reality electronic device according to claim 1, wherein the light adjusting component further comprises a first polarizer disposed on the first side of the panel, and the first quarter wave plate is disposed between the first substrate and the first polarizer.

8. The augmented reality electronic device according to claim 1, wherein the light adjusting component further comprises:
a phase compensation film disposed on the second side of the panel;
a first half wave plate disposed on the first side of the panel; and
a second half wave plate disposed on the second side of the panel.

9. The augmented reality electronic device according to claim 8, wherein the first quarter wave plate is disposed between the first substrate and the first half wave plate, and the phase compensation film is disposed between the second substrate and the second half wave plate.

10. The augmented reality electronic device according to claim 9, wherein the light adjusting component further comprises:
a first polarizer disposed on the first side of the panel; and
a second polarizer disposed on the second side of the panel;
wherein the first half wave plate is disposed between the first quarter wave plate and the first polarizer, and the second half wave plate is disposed between the phase compensation film and the second polarizer.

11. The augmented reality electronic device according to claim 1, further comprising a waveguide disposed on the first side of the panel.

12. An augmented reality electronic device, comprising:
a light adjusting component, comprising:
a first substrate;
a second substrate opposite to the first substrate;
a medium layer disposed between the first substrate and the second substrate;
a first quarter wave plate disposed on a first side of the first substrate;
a second quarter wave plate disposed on a second side of the first substrate, wherein the second side is opposite to the first side, the second quarter wave plate is disposed between the first substrate and the medium layer;
a first polarizer disposed on the first side of the first substrate; and
a second polarizer disposed on the second side of the first substrate;
wherein the first quarter wave plate is disposed between the first substrate and the first polarizer, and the second substrate is disposed between the medium layer and the second polarizer.

13. The augmented reality electronic device according to claim 12, wherein the first substrate comprises a plurality of metal lines.

14. The augmented reality electronic device according to claim 13, wherein the first quarter wave plate has a first slow-axis direction, the second quarter wave plate has a second slow-axis direction, the first slow-axis direction of the first quarter wave plate is perpendicular to the second slow-axis direction of the second quarter wave plate.

15. The augmented reality electronic device according to claim 12, wherein a reflectivity of the first substrate is greater than a reflectivity of the second substrate.

16. The augmented reality electronic device according to claim 12, wherein the light adjusting component further comprises:
a first half wave plate disposed on the first side of the first substrate; and
a second half wave plate disposed on the second side of the first substrate.

17. The augmented reality electronic device according to claim 16, wherein the first quarter wave plate is disposed between the first substrate and the first half wave plate, and the second quarter wave plate is disposed between the first substrate and the second half wave plate.

18. The augmented reality electronic device according to claim 12, further comprising a waveguide disposed on the first side of the first substrate.

* * * * *